United States Patent [19]
Lubachevsky et al.

[11] Patent Number: 5,815,158
[45] Date of Patent: Sep. 29, 1998

[54] METHOD AND APPARATUS FOR VIEWING LARGE ENSEMBLES OF THREE-DIMENSIONAL OBJECTS ON A COMPUTER SCREEN

[75] Inventors: Boris Dmitrievich Lubachevsky, Bridgewater; Ibrahim Emre Telatar, North Plainfield, both of N.J.

[73] Assignee: Lucent Technologies, Murray Hill, N.J.

[21] Appl. No.: 581,387

[22] Filed: Dec. 29, 1995

[51] Int. Cl.$^6$ .................................................. G06T 15/40
[52] U.S. Cl. ............................................................. 345/427
[58] Field of Search ................................. 395/121, 133, 395/135; 345/435, 421, 433

[56] References Cited

U.S. PATENT DOCUMENTS

| | | | |
|---|---|---|---|
| 5,295,234 | 3/1994 | Ishida et al. | 345/421 |
| 5,426,726 | 6/1995 | Horiuchi et al. | 345/467 |
| 5,579,454 | 11/1996 | Billyard et al. | 345/421 |

OTHER PUBLICATIONS

Wolfe, et al., "Visual Revelations from Silicon Ab Initio Calculations," IEEE Computer Graphics and Applications Magazine, vol. 12, No. 4, Jul. 1992, pp. 45–53.

Foley, James D. et al., Computer Graphics: Principles and Practice, 2nd ed. Addison–Wesley Publishing Co., 1990, pp. 237–239, 673.

After Dark, version 1.1, a computer utility application ("screen saver") by Berkeley Systems, Inc., copyright 1991. (See also After Dark now armed with four new modules, MacWEEK, Apr. 24, 1990, vol. 4, No. 16, p. 11.), Apr. 1991.

Goodsell, et al., "Rendering volumetric data in molecular systems," J. Mol. Graphics, 1989, vol. 7, Mar., pp. 41–47.

Molecular 3–D Pro, a product of Molecular Arts Corp., Computer Select, Dec. 1995.

*Primary Examiner*—Anton Fetting

[57] ABSTRACT

A method and apparatus for visually rendering a three dimensional structure as an image on a two dimensional display without specialized hardware. The invention renders each object of the structure one at a time on the display in descending order according to a measured distance, i.e., rear to front of the structure, of the object from a predetermined view point. As each object is rendered, depth relationships between the objects are conveyed to users. To reduce the number of computations required for rendering the objects, the present method and apparatus use a reference point to determine the measured distance from the predetermined view point to each object.

21 Claims, 5 Drawing Sheets

INPUT: x, y, z AND RADIUS OF 8 SPHERES

400

| SPHERE # | x | y | z | RADIUS |
|---|---|---|---|---|
| 1 | −8.516 | 0.231 | −15.040 | 10.104 |
| 2 | −13.557 | 4.346 | 5.090 | 10.104 |
| 3 | −16.822 | −7.260 | −36.844 | 10.104 |
| 4 | 2.409 | 3.316 | 38.950 | 10.104 |
| 5 | 7.607 | 9.779 | −1.591 | 10.104 |
| 6 | 10.828 | 5.796 | 19.827 | 10.104 |
| 7 | −8.593 | −6.078 | 24.079 | 10.104 |
| 8 | 11.521 | −2.033 | −21.186 | 10.104 |

FIG. 4B

FOR EYE POSITION X=0, Y=0, Z=−200, PROCESSING YIELDS

410

| SPHERE # | DIST = $\sqrt{(x-X)^2+(y-Y)^2+(z-Z)^2}$ | x/DIST | y/DIST | RADIUS/DIST |
|---|---|---|---|---|
| 1 | 185.156 | −0.046 | 0.001 | 0.055 |
| 2 | 205.584 | −0.066 | 0.021 | 0.049 |
| 3 | 164.181 | −0.102 | −0.044 | 0.062 |
| 4 | 238.985 | 0.010 | 0.014 | 0.042 |
| 5 | 198.795 | 0.038 | 0.049 | 0.051 |
| 6 | 220.170 | 0.049 | 0.026 | 0.046 |
| 7 | 224.327 | −0.038 | −0.027 | 0.045 |
| 8 | 179.20 | 0.064 | −0.011 | 0.056 |

FIG. 4C

SORTING IN DECREASING ORDER ON DIST YIELDS

420

| SPHERE # | DIST = | x/DIST | y/DIST | RADIUS/DIST |
|---|---|---|---|---|
| 4 | 238.985 | 0.010 | 0.014 | 0.042 |
| 7 | 224.327 | −0.038 | −0.027 | 0.045 |
| 6 | 220.170 | 0.049 | 0.026 | 0.046 |
| 2 | 205.584 | −0.066 | 0.021 | 0.049 |
| 5 | 198.795 | 0.038 | 0.049 | 0.051 |
| 1 | 185.156 | −0.046 | 0.001 | 0.055 |
| 8 | 179.196 | 0.064 | −0.011 | 0.056 |
| 3 | 164.181 | −0.102 | −0.044 | 0.062 |

METHOD AND APPARATUS FOR VIEWING LARGE ENSEMBLES OF THREE-DIMENSIONAL OBJECTS ON A COMPUTER SCREEN

FIELD OF THE INVENTION

The present invention relates to interactive computer graphics systems, and more particularly to a technique for viewing large ensembles of three-dimensional objects on a computer screen.

BACKGROUND OF THE INVENTION

A variety of computer graphics systems have been developed to generate or visually render three-dimensional structures comprised of multiple objects on a two-dimensional or flat display, such as a CRT screen. Generally, each point of an object in three-dimensional space is described in a world coordinate system having x, y and z axes. It is well known that objects described with reference to the world coordinate system must be transformed to a view reference coordinate system in order to be generated on the display. The view reference coordinate system has x, y and z axes with an origin fixed at a predetermined view point of a user and the z-axis perpendicular to the surface of the display. Since the display is two-dimensional, only width and length information corresponding to the x and y axes, respectively, can be visually rendered on the display. Depth information corresponding to the z-axis is typically unavailable through a flat display. Pixels of the display are referenced by x and y coordinates in the same manner that points on a graph are referenced.

In the development of a three-dimensional computer graphics system, conveying the depth information to a user is often the most challenging hurdle. To visually render the depth information on the display, the systems of the prior art employ binocular and rotation techniques. The former technique utilizes binocular vision to convey depth information. Specifically, the binocular technique synchronously generates two flat images of an object as perceived by each eye of a user at a predetermined view point. It is well known that the human brain is able to convert these two flat images into one consistent three-dimensional perception, thereby conveying depth information. Since the binocular technique requires two flat images to be generated simultaneously, computer processing time is approximately doubled. To deliver the binocular effect, specialized hardware is needed. The specialized hardware may include a mechanism for superimposing the two images on the same display in different colors, or viewing glasses that filter and deliver the two views to each eye.

The rotation technique exploits a fourth dimension or time dimension, to convey the depth information. Specifically, the rotation technique visually renders a structure as two-dimensional images from different view points. The different views are generated over a sequence of time frames such that the structure appears to rotate. Rotating a three-dimensional object involves substantial computations which increase computer processing time and restrict rotation speed, i.e., rate at which the different views of the structure are generated on the display. To rotate the structure on the display in real time, as the term is known in the art, vendors are forced to introduce specialized hardware for expediting the computations. Thus, prior art systems employing the above described techniques require special enhancements which translate into lower availability and higher expenses for the user.

When rendering a three dimensional object, a significant portion of computer processing time is expended on computations involving hidden surface removal for erasing surfaces of objects partially or completely obscured by other objects as perceived from a predetermined view point. Hidden surface removal is often implemented through a mechanism known as a z-buffer. A z-buffer is a region of memory that stores z coordinates representing the depth or distance from the predetermined view point to a pixel.

Hidden surface removal essentially involves depth comparison using the z-buffer. Specifically, the depth of a "new" object to be rendered is compared to the depth of one or more objects being generated on the display and sharing the same x and y coordinates (also referred to as "overlapping objects"). When it is determined that the new object is closer to the predetermined view point than the overlapping objects, the new object is rendered on the display, i.e., pixels comprising relevant portions of the overlapping objects are replaced with pixels defining the new object. This process is repeated for each new object. Designers of the prior art systems typically presumed users wanted only to see the front surface of the structure and judged it an undesirable side effect to render the new objects on the display one at a time. Accordingly, the typical prior art systems employ a mechanism known as a pixel image space, which is a region of memory for storing pixel information prior to generating the image on a display. Instead of rendering new objects on the display one at a time, the pixel information for the new objects are stored in the pixel image space. When the depth comparison is performed for the last object in the structure, the pixel information stored in the pixel image space is rendered on the display providing the users with a view of the front surface of the structure.

One prior art technique for hidden surface removal uses a well-known depth-sort algorithm. See "37A Solution to the Hidden Surface Problem" Proc. ACM Nat. Conf., 1972, pages 443–450, by M. E. Newell, R. G. Newell and T. L. Sancha. Specifically, the depth-sort algorithm sorts all objects according to the largest z coordinate of each object; resolves any ambiguities regarding larger z coordinates that may be caused when the object's z extents overlap; and maps each object to the pixel image space in descending order of largest z coordinate. The ambiguities referred to in the second step are resolved by testing a first object P against a set of objects Q having z extents that overlap the z extents of the object P.

The test for resolving ambiguities is a sequence of up to five checks which are performed in order of increasing complexity to determine precisely whether the object P obscures any object Q. The first check determines whether the objects' x extents overlap. The second check determines whether the objects' y extents overlap. The third check ascertains whether the object P is wholly on a side of a plane of the object Q which is further from a predetermined view point. The fourth check ascertains whether the object Q is wholly on a side of a plane of the object P which is nearer the predetermined view point. The fifth and final check determines whether projections of the objects onto the display overlap. If it is determined that the object P does not overlap or obscure any object Q, the object P is mapped to the pixel image space. Otherwise the object P obscures one or more objects Q and the pixel information for the obscured objects Q are replaced with the pixel information for the object P to the extent they overlap. Note that ambiguity resolution involves substantial computation thereby increasing computer processing time or forcing vendors to introduce specialized hardware for expediting computations.

Because of the above described disadvantages of the prior art computer graphics systems, there exists a need to efficiently convey depth information to a user on a two-dimensional display of a computer graphics system without the need for specialized hardware.

SUMMARY OF THE INVENTION

The present invention is a method and apparatus for visually rendering or presenting a three-dimensional structure as an image on a two-dimensional display of a computer graphics system efficiently without the need for specialized hardware. The three-dimensional structure is comprised of three-dimensional objects described by a corresponding set of geometric data, and the display has a view reference coordinate system. In an advantageous embodiment, the invention specifies a view point in the view reference coordinate system, wherein the view point represents a fixed coordinate corresponding to an eye position of a user. A reference point is determined for each object using the corresponding set of geometric data. The distance from the view point to each object is then measured using the reference points. The present invention then renders the structure one object at a time on the two dimensional display using the corresponding set of geometric data and the distances being measured.

Advantageously, the present invention exploits a time dimension to convey depth information in a novel manner. By rendering the structure one object at a time, depth relationship between each object is visually rendered to users. Furthermore, the present invention significantly reduces the number of computations needed to render the objects on the display. By reducing the number of computations, specialized hardware is no longer required for expediting the computations.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

Figure 1:
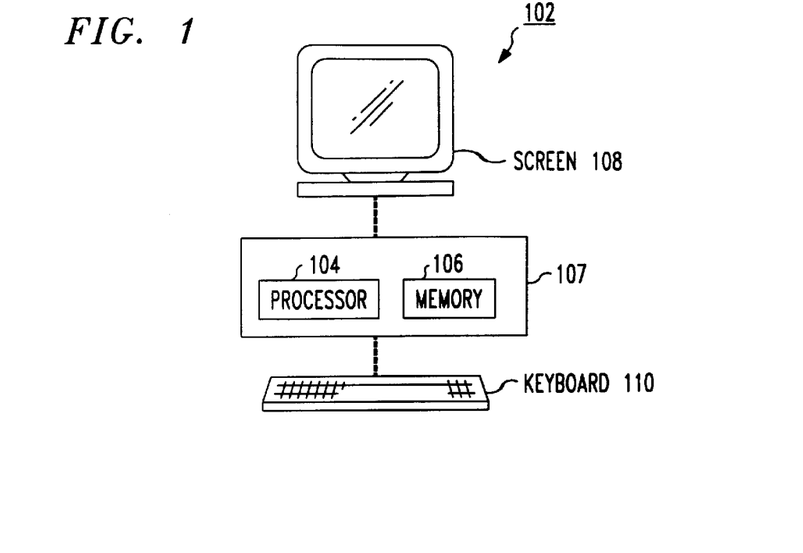
FIG. 1 depicts a computer graphics system for incorporating the teachings of the present invention.

Referring to FIG. 1, there is shown an exemplary representation of a computer graphics system 102 used in connection with the present invention. The computer graphics system 102 is shown comprising a computing device 107, a display 108 and an input device 110, among other components. These components are collectively known as hardware. The display 108 may be a two-dimensional CRT screen or a printer for providing two-dimensional output from the computer graphics system 102. The input device 110 allows data to be input to the computer graphics system 102 and may be a keyboard, a computer mouse, a card reader, a scanner, other computers or similar devices as would be understood by a person skilled in the art.

The computing device 107 further includes a processor 104 and a memory 106, wherein the processor 104 is provided for interpreting and executing computer instructions and the memory 106 is an addressable storage space that is used in the execution of computer instructions. In an advantageous embodiment, the present invention may be implemented as a series of software instructions resident in the memory 106 of the computer graphics system 102. Alternately, the software instructions corresponding to the present invention can be found resident in a memory of a centralized computer, not shown, to which the computer graphics system 102 is connected.

Figure 2:
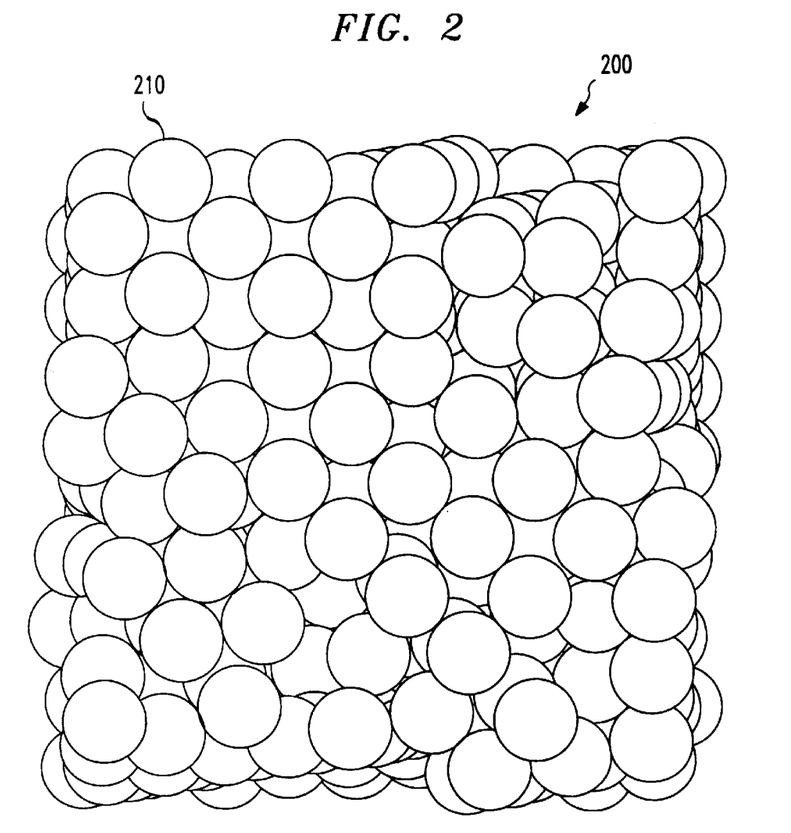
FIG. 2 depicts an exemplary example of a graphics display of five hundred three-dimensional spheres packed in a cubic cell.

The present invention sets forth a novel method and apparatus for efficiently conveying depth information to a user on a two-dimensional display without specialized hardware. Referring to FIG. 2, there is illustrated an exemplary example of a graphics display 200 of five hundred three-dimensional spheres i packed in a cubic cell, where i=1, . . . , 500. Each sphere, such as sphere 210, is described by geometric data, such as an $(x_i, y_i, z_i)$ coordinate and a radius ri, indicating a location and a shape. The $(x_i, y_i, z_i)$ coordinate defines a center $d_i$, of each sphere. The present invention conveys the depth information for the spheres by determining a distance $D_i$ to each sphere from a predetermined view point. The spheres are then sorted in descending order according to the distances being determined. Subsequently, each sphere is rendered on the display 108 in descending order according to distance $D_i$.

The above first two steps of the present invention determine which spheres may be obscured by other spheres by performing depth comparisons. In the first step, a distance $D_i$ from the predetermined view point is determined using a reference point for each sphere. The predetermined view point is a fixed coordinate in the view reference coordinate system corresponding to an "eye" position of a user. Preferably the position of the eye is at infinity such that projecting rays are collinear. Projecting rays, analogous to light rays in photography, are imaginary straight lines which begin at an object and end at a viewing surface, e.g.,a display. The reference point is a coordinate inside or outside of the sphere and is determined using the corresponding geometric data for the sphere. Preferably, each reference point has the same relative position to its corresponding sphere. An exemplary reference point for each sphere is its center $d_i$. Alternately, the reference point may be a point on the surface of the sphere closest to the predetermined view point. The distance $D_i$ to each sphere is measured from the predetermined view point to the reference point. In the second step, the spheres are sorted in descending order according to its distances $D_i$.

The present invention's usage of reference points offers a significant advantage over prior art systems that use a well-known depth-sort algorithm. The advantage afforded is reduction in computer processing time. The depth-sort algorithm of the prior art uses z coordinates and z extents of an object, i.e., amount an object extends along the z axis, to determine whether the object is obscured by another object. Ambiguities arises when the z extents of two or more objects overlap. To resolve the ambiguity, a test having five checks of increasing complexity is administered. This translates into increased computer processing time delaying the rendering of the object on the display in the absence of specialized hardware for expediting computations.

In a third step, the present invention exploits a time dimension to convey depth information. Specifically, each sphere i is rendered one at a time on the display 108 in descending order according to distance $D_i$. Since designers of prior art systems typically presumed users were only interested in viewing the final image of the structure, the designers considered this step inefficient and a waste of resources, particularly when the structure being rendered has substantial depth and a high density of small objects. In order to eliminate this undesirable side effect, the prior art systems used pixel image spaces to store the pixel information prior to presenting the final structure on the display. The present invention converts what was considered a disadvantage in prior art systems to an advantage. By rendering one sphere at a time in descending order, i.e., from rear to front, the present invention permits the users to view the depth relationship between the spheres. Furthermore, additional information is offered allowing users to examine the structure from within. This feature is particularly advantageous for viewing crystalline structures, stack faults in crystalline parts and amorphous matter enclosures. In one exemplary embodiment of the present invention, the user may specify a group of objects, i.e., a portion of the structure, to view and the rate at which the spheres are rendered on the display.

One exemplary embodiment of the present invention renders the spheres on the display 108 in accordance with the following steps. After the spheres i have been sorted according to distance $D_i$, a pixel map of a contour for each sphere i is created and rendered on the display 108 in descending order of distance $D_i$. A pixel map is a three-dimensional array of bits for storing pixel information and is created in two sub-steps. In the first sub-step, a black projection of sphere i is drawn to the pixel map. The black projection is essentially a disk of radius $r_i$ at $(x_i, y_i)$ having a color with its intensity set to maximum. In the second sub-step, a slightly smaller white projection of sphere i is drawn to the pixel map. The white projection is a concentric disk of radius $r_i$-$\epsilon$, where $\epsilon$ controls contour line width, having a color with its intensity set to minimum. Upon completion of the pixel map, the sphere i is rendered on the display 108. This procedure is repeated for the sphere i with the next largest distance $D_i$ until all the specified spheres i are rendered on the display. As the pixel map of each subsequent sphere i overwrites those of previously rendered spheres i, visible and hidden surfaces are rendered thereby conveying depth information.

Figure 3:
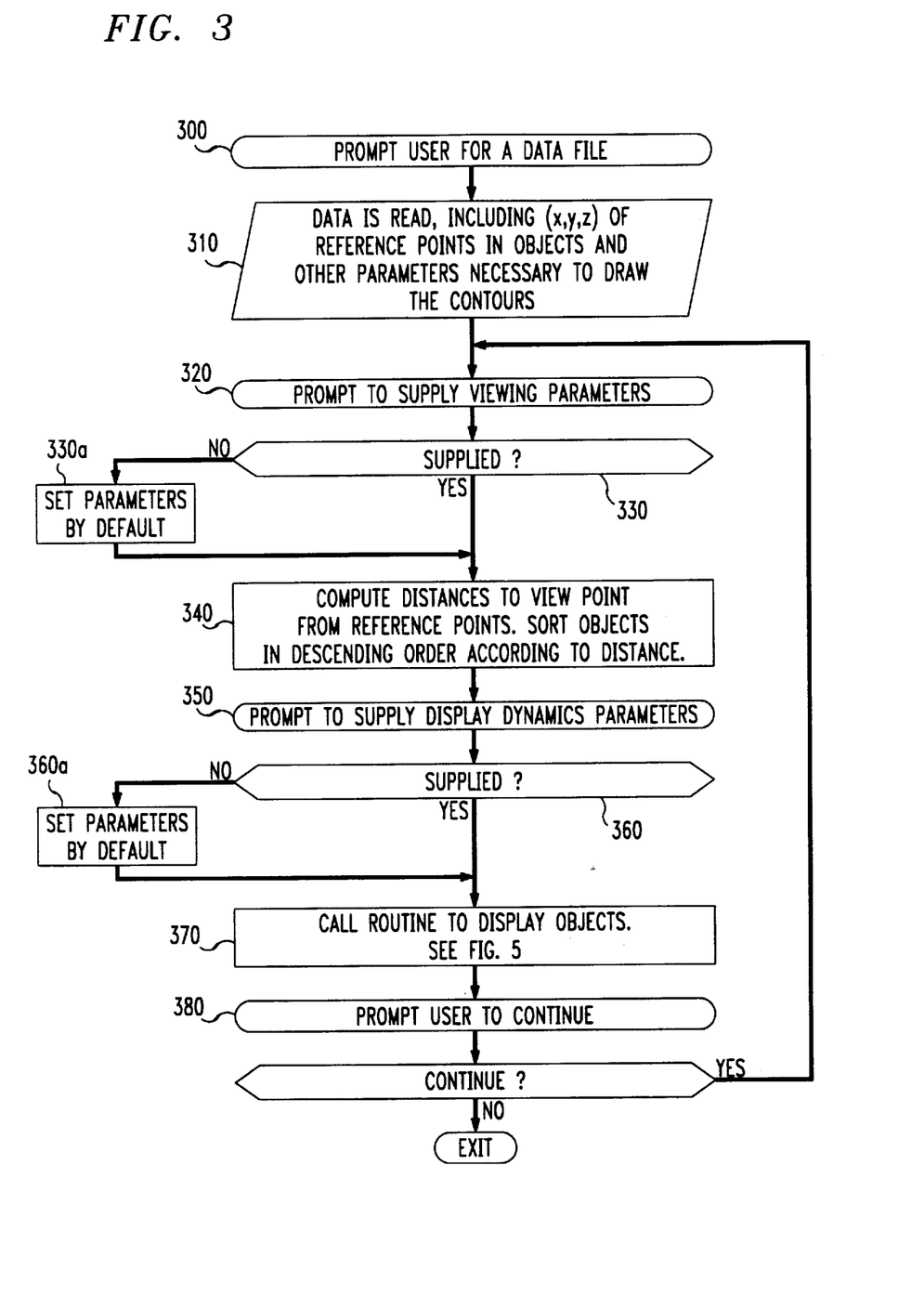
FIG. 3 depicts a flowchart of an exemplary implementation of the present invention.
Figure 4A:
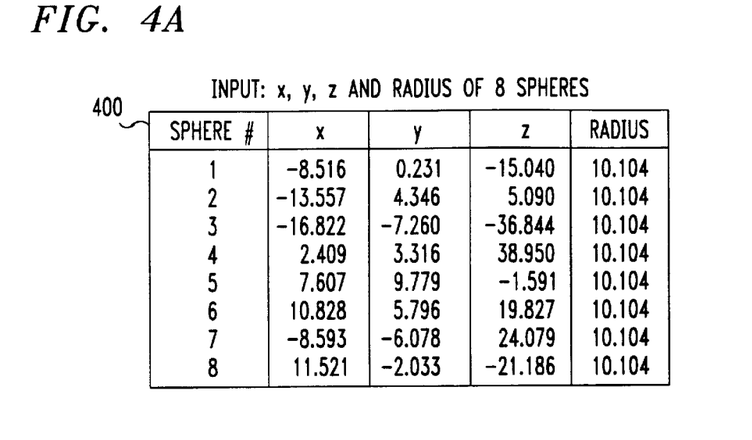
FIG. 4 depicts a set of data for a structure comprised of eight spheres of equal radii.
Figure 4B:
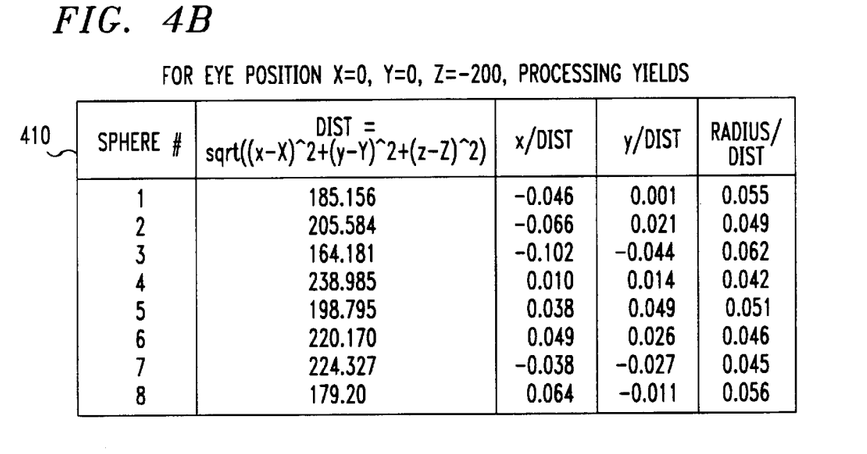
Figure 4C:
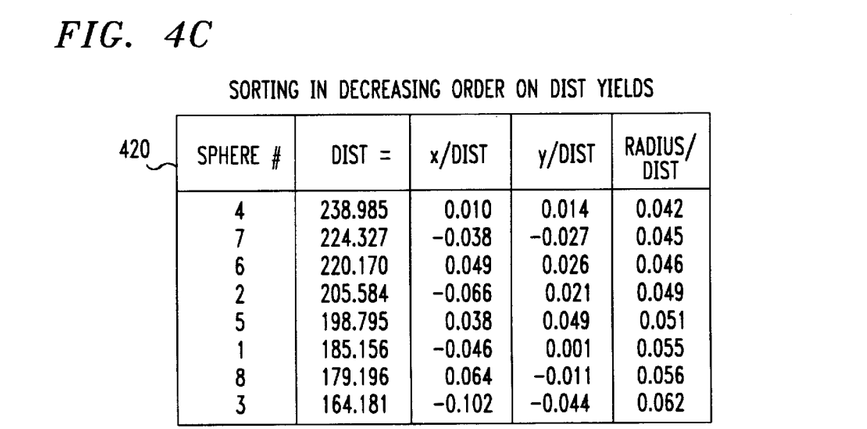

Referring to FIG. 3, a flowchart is provided to illustrate an exemplary implementation of the present invention. In step 300, a user is prompted for a data file to be read. Upon the user providing such information, in step 310, the data file is read by the computing device 107 into its memory 106. A data file 400 for an ensemble of eight spheres having equal radii is provided for illustration purposes in FIG. 4. As shown in FIG. 4, the data file 400 includes an $(x_i, y_i, z_i)$ coordinate and a radius ri for each sphere. In step 320, the user is prompted to supply viewing parameters, such as coordinates for the view point, scale, etc. In step 330, a determination is made whether the user supplied the necessary viewing parameters. If the viewing parameters were supplied, the invention continues to step 340. If no viewing parameters are provided, default parameters are read into the memory 106 from another data file in step 330*a* prior to continuing to step 340. For illustration purposes, the view point parameters supplied have the coordinates $X_0=0$, $Y_0=0$ and $Z_0=-200$, where the subscript 0 denotes the view point.

In step 340, the distances $D_i$ are computed and sorted in descending order. Using the view point parameters, the distances $D_i$ are computed using the corresponding equation:

$$D_i = sqrt((x_i-X_0)^2+(y_i-Y_0)^2+(z_i-Z_0)^2).$$

Table 410 in FIG. 4 depicts the distance $D_i$ from the default view point for the corresponding spheres in the data file 400. Table 420 illustrates the sequence of the spheres sorted in descending order according to the distance $D_i$. In step 350, the user is prompted to supply display dynamics parameters, such as the first and last objects to be displayed, how many objects to display before pausing and a time delay to be interposed between the presentation of the next object. In step 360, a determination is made whether the user supplied the necessary display dynamics parameters. If no display dynamics parameters are supplied, then default display dynamics parameters are read into the memory 106 from another data file in step 360*a*.

Figure 5:
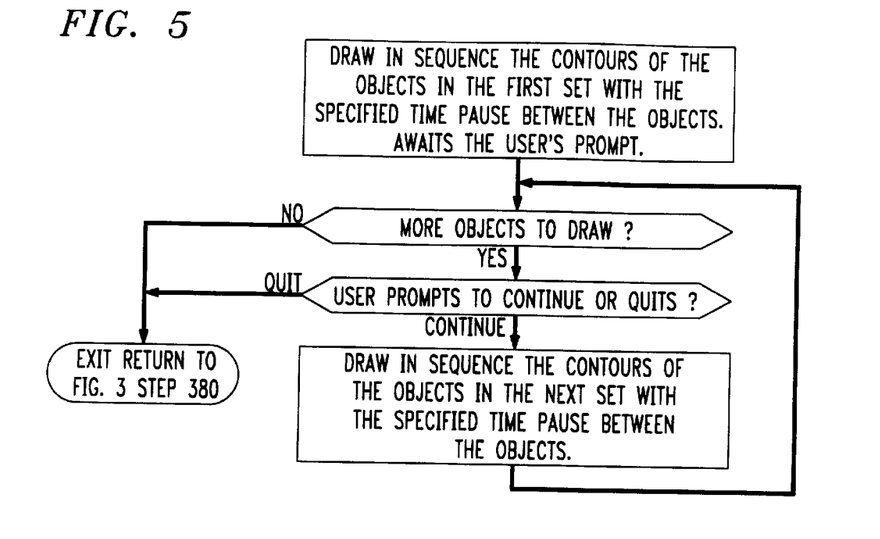
FIG. 5 depicts a flowchart of an exemplary routine for rendering objects on a display in accordance with the present invention.
Figure 6:
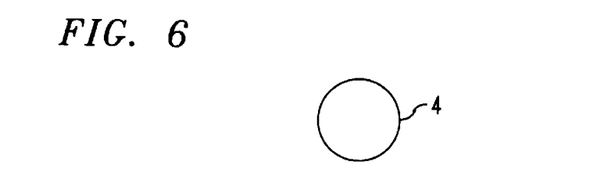
FIGS. 6–6g depict a manner for rendering the spheres represented by the data in FIG. 4 in accordance with the present invention.
Figure 6A:
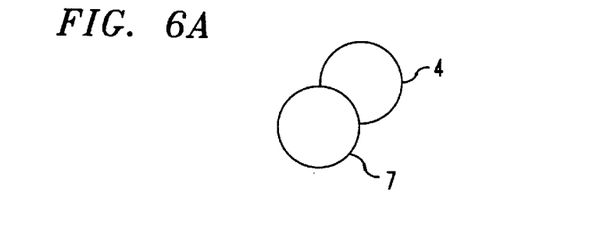
Figure 6B:
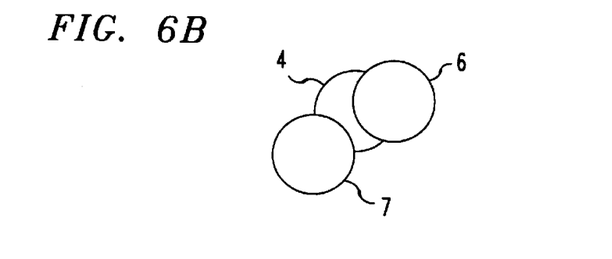
Figure 6C:
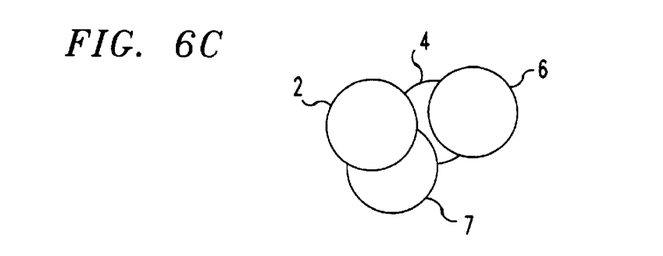
Figure 6D:
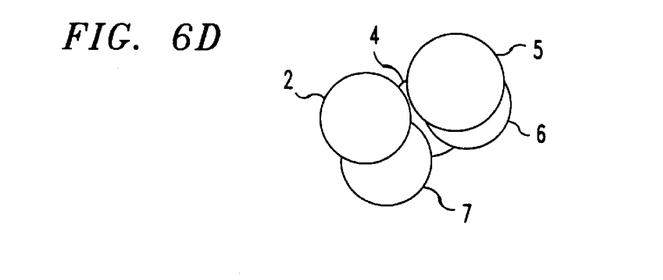
Figure 6E:
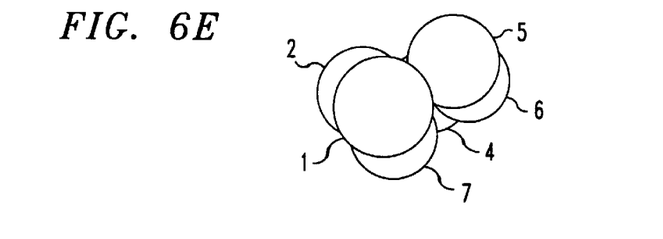
Figure 6F:
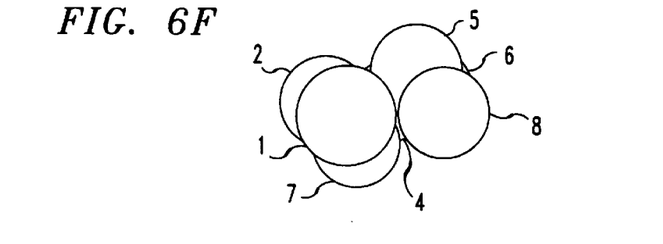
Figure 6G:
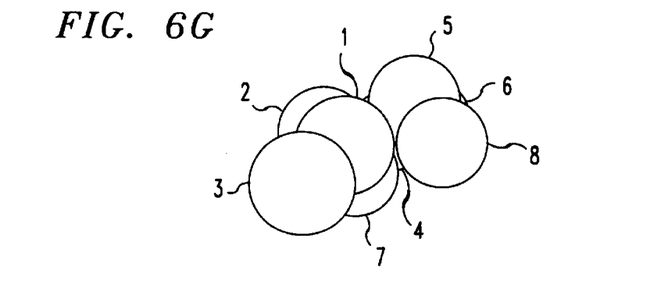

In step 370, a routine is called to render the specified spheres onto the display 108. Referring to FIG. 5, there is illustrated an exemplary flowchart of a routine for rendering sets of objects on a display in accordance with the present invention. In step 510, the contours of a first set of spheres are drawn in sequence with a specified time delay interposed between the presentation of each spheres. Suppose the user specified, in step 350, to view all eight spheres in two equal sets, i.e., four spheres, with a time delay of one second interposed between the rendering of each sphere. FIGS. 6–6*g* illustrate the manner in which the spheres in the data file 400 are rendered on the display.

As shown in FIG. 6, a first sphere 4 is rendered on the display. After a time delay of one second, as shown in FIG. 6*a*, a second sphere 7 is rendered on the same display overwriting the first sphere 4 where the two spheres 4 and 7 overlap. Similarly, as shown in FIGS. 6*b* and 6*c*, a third and fourth sphere 6 and 2 comprising the last two spheres of a first set of spheres are rendered on the same display. As each sphere is rendered on the display, a depth relationship between each sphere is conveyed to the user. In step 520, the user is prompted whether to continue or quit. Upon selecting the quit option, control is returned to the flowchart in FIG. 3 at step 380. Otherwise, in step 530, spheres 5, 1, 8 and 3 are rendered on the display, as shown in FIGS. 6*d*–*g*.

Although the present invention has been described with reference to spherical objects, the present invention can be applied to three-dimensional objects of any shape. Accuracy is guaranteed for most objects of equal size and orientation, such as spheres having the same radii, in a view reference coordinate system with the projecting rays being collinear. The present invention yields an image quickly without the need for specialized hardware.

The above description is an advantageous mode of carrying out the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

We claim:

1. A method for visually rendering a three dimensional graphics structure having a plurality of objects on a two dimensional display, said method comprising the steps of:

measuring a distance from a view point to a reference point for each object, said view point being a fixed coordinate in a view reference coordinate system of said display corresponding to an eye position of a user;

rendering said objects one at a time on said display based on measured distances from said view point to each said reference point, wherein a time determined and controlled by said user is interposed between rendering of each said object;

said step of rendering including the steps of grouping a set of objects representing a portion of said three dimensional graphics structure;

marking a first and last object in said set of objects; and selecting a rate at which each object of said set of objects is to be rendered, wherein said user can analyze said structure by rendering different sets of objects which represents different portions of said structure.

2. The method of claim 1 wherein said objects are rendered on said display in descending order based on said measured distances from said view point to said reference point.

3. The method of claim 1 wherein said view point has projecting rays which are collinear to said objects being rendered on said display.

4. The method of claim 1 wherein said reference point is a coordinate in said view reference coordinate system having a like relative position in each corresponding said object.

5. The method of claim 1 wherein said reference point is a coordinate in said view reference coordinate system representing centers of said objects.

6. The method of claim 1 wherein said reference point is a coordinate corresponding to points on surfaces of said objects nearest to said view point.

7. The method of claim 1 wherein each of said objects being rendered is a sphere having a like radius.

8. The method of claim 1 wherein said step of rendering said objects includes the steps of:

sorting said objects in descending order according to said measured distances from said view point to said reference point, wherein said objects are rendered in sorted order of said measured distances.

9. The method of claim 8 wherein said step of rendering said objects includes the steps of:

creating one or more pixel maps for said objects to be rendered using geometric data that describes said objects; and mapping said objects individually to said display based on said measured distances from said view point to said reference points utilizing said pixel maps.

10. The method of claim 9 wherein said step of creating said pixel map includes the step of:

drawing a contour of each said object to be rendered to said pixel map using said geometric data.

11. The method of claim 10 wherein said objects are spheres of equal radii, and said step of drawing said contour includes the steps of:

rendering a first disk of a predetermined first color to said pixel map using said geometric data; and overwriting said first disk with a concentric second disk in said pixel map using said geometric data, said concentric second disk having a predetermined second color and a smaller radius than said first disk.

12. The method of claim 9 wherein said step of mapping said objects includes the step of:

replacing pixels of said objects being rendered on said display with pixels of mapped object to an extent said objects being rendered and said mapped object overlap.

13. The method of claim 9 wherein said step of mapping said objects includes the step of:

interposing a time delay between each said object being mapped to said display to decrease the rate at which said objects are being rendered on said display thereby allowing said user to examine depth relationships of said objects being rendered.

14. The method of claim 1 wherein said step of rendering said objects includes the step of:

pausing said step of rendering said objects after a number of said objects have been rendered on said display to permit said user to view said structure from within.

15. An apparatus for visually rendering a three dimensional graphics structure having a plurality of objects on a two dimensional display, said apparatus comprising:

means for measuring a distance from a view point to a reference point for each object, said view point being a fixed coordinate in a view reference coordinate system of said display corresponding to an eye position of a user;

means for rendering said objects one at a time on said display based on measured distances from said view point to each said reference point, wherein a time determined and controlled by said user is interposed between rendering of each said object;

said means for rendering further including the steps of:

means for grouping a set of objects representing a portion of said three dimensional graphics structure;

means for marking a first and last object in said set of objects; and means for selecting a rate at which each object of said set of objects is to be rendered, wherein said user can analyze said structure by rendering different sets of objects which represents different portions of said structure.

16. The apparatus of claim 15 further comprising:

means for sorting said objects in descending order according to said measured distances from said view point to said reference points, wherein said means for rendering presents said objects in sorted order of said measured distances.

17. The apparatus of claim 16, further including:

means for creating one or more pixel maps for each said object to be rendered utilizing a corresponding set of geometric data describing said object; and means for mapping said objects individually to said display in said sorted order of said measured distances using said pixel maps.

18. The apparatus of claim 17 wherein said means for creating said pixel map further includes:

means for drawing a contour of said objects to be rendered to said pixel map using said geometric data.

19. A computer readable storage medium comprising encoded computer readable program instructions and data encoded thereon for use in conjunction with a programmable computer for visually rendering a three dimensional graphics structure having a plurality of objects on a two dimensional display, comprising:

means for measuring a distance from a view point to a reference point for each object, said view point being a fixed coordinate in a view reference coordinate system of said display corresponding to an eye position of a user;

means for rendering said objects one at a time on said display based on measured distances from said view point to each said reference point, wherein a time determined and controlled by said user is interposed between rendering of each said object;

said means for rendering including means for grouping a set of objects representing a portion of said three dimensional graphics structure; and said means for rendering further including means for grouping a set of objects representing a portion of said three dimensional graphics structure;

said means for rendering further including means for making a first and last object in said set of objects; and said means for rendering further including means for selecting a rate at which each object of said set of objects is to be rendered, wherein said user can analyze said structure by rendering different sets of objects which represents different portions of said structure.

20. The computer readable storage medium of claim 19 wherein said medium includes means for sorting said objects in descending order according to said measured distances from said view point to said reference points, wherein said means for rendering presents said objects in sorted order of said measured distances.

21. The computer readable storage medium of claim 19 wherein said medium includes:

means for creating one or more pixel maps for said objects to be rendered using geometric data that describes said objects; and means for mapping said objects individually to said display based on said measured distances from said view point to said reference points utilizing said pixel maps.

* * * * *